US007182448B2

(12) United States Patent
Godil et al.

(10) Patent No.: US 7,182,448 B2
(45) Date of Patent: Feb. 27, 2007

(54) ADAPTIVE POWER CONTROL OF INK MELT HEATERS FOR UNIFORM INK MELT RATE

(75) Inventors: Amin M. Godil, Vancouver, WA (US); Larry E. Hindman, Woodburn, OR (US)

(73) Assignee: Xerox Corporation, Stamford, CT (US)

( * ) Notice: Subject to any disclaimer, the term of this patent is extended or adjusted under 35 U.S.C. 154(b) by 211 days.

(21) Appl. No.: 10/749,723

(22) Filed: Dec. 30, 2003

(65) Prior Publication Data

US 2005/0140713 A1 Jun. 30, 2005

(51) Int. Cl.
*B41J 2/175* (2006.01)
*G01D 11/00* (2006.01)

(52) U.S. Cl. .......................................... 347/88; 347/99

(58) Field of Classification Search ................. 347/88, 347/99, 84, 85, 95
See application file for complete search history.

(56) References Cited

U.S. PATENT DOCUMENTS 4,593,292 A * 6/1986 Lewis ......................... 347/88
4,607,266 A * 8/1986 DeBonte ...................... 347/88
4,627,740 A * 12/1986 Jerde et al. .................... 374/1
5,235,350 A * 8/1993 Lin et al. ....................... 347/88
5,406,315 A * 4/1995 Allen et al. ..................... 347/7
5,406,325 A * 4/1995 Parulski et al. ............... 348/97
5,424,767 A * 6/1995 Alavizadeh et al. .......... 347/17
5,771,054 A * 6/1998 Dudek et al. ............... 347/102
5,920,330 A * 7/1999 Ikezaki ........................ 347/33
5,992,991 A * 11/1999 Kanemoto et al. ............ 347/88
6,196,672 B1 * 3/2001 Ito et al. ....................... 347/88
6,227,641 B1 * 5/2001 Nishikori et al. ............. 347/17
6,276,790 B1 * 8/2001 Ikezaki ........................ 347/88
6,293,638 B1 * 9/2001 McDonald ..................... 347/4
6,554,386 B2 * 4/2003 Classens et al. .............. 347/17
7,118,205 B2 * 10/2006 Jones et al. .................. 347/88
2002/0063762 A1 * 5/2002 Haan et al. .................. 347/88

FOREIGN PATENT DOCUMENTS

JP 61287769 A * 12/1986

* cited by examiner

*Primary Examiner*—Manish Shah
*Assistant Examiner*—Leonard Liang
(74) *Attorney, Agent, or Firm*—Fay, Sharpe, Fagan, Minnich & McKee, LLP

(57) ABSTRACT

A method and system for selectively controlling supplied power to an ink melt heater for maintaining a desired ink melt rate despite a varying ambient parameter affecting an actual melt rate. A predetermined amount of power is supplied to the ink melt heater intended to cause the desired ink melt rate. The ambient parameter is detected by the ink melt heater. A determination is made if the detected ambient parameter will cause a variance in the actual ink melt rate from the desired ink melt rate. If a variance is so determined, the supplied power is adjusted from the predetermined amount to an adjusted amount for realizing desired ink melt rate. The ambient parameter preferably comprises sensing a factor representative of at least one of local environmental air temperature to the printing system or adjacent ink temperature to the heat plate.

10 Claims, 4 Drawing Sheets

ADAPTIVE POWER CONTROL OF INK MELT HEATERS FOR UNIFORM INK MELT RATE

BACKGROUND

The present exemplary embodiments relate to printing systems and, in particular, printing devices which utilize a supply of colored inks to be communicated to a print head for document printing. More particularly, the present embodiments utilize solid ink sticks as the supply ink, which must be heated to a liquid form before being capable of communication to the print head. Such systems are commercially available under the PHASER® mark from Xerox Corporation.

The present embodiments concern the structure, control system and operation methods of the heater element for causing a phase change in the solid ink supply to a liquid form capable of fluid communication to a print head for document printing.

The basic operation of such phasing print systems comprises the melting of a solid ink stick, its communication to a reservoir for interim storage, and then a supply process from the reservoir to a print head for printing of a document. The object of the control strategy is to avoid the printing system running out of ink while trying to print, because such an event can be a catastrophic failure to the system. Prior known systems will typically supply a measuring device in the reservoir to monitor ink levels therein. When the ink drops below a certain level due to normal usage, then the ink supply control system would melt more of the solid ink supply until the reservoir would refill to the desired level. The steps of asking for more ink, turning on the melter to melt the solid ink, delivering the ink to the reservoir to a desired level and then turning the heater off is commonly referred to as an "ink melt duty cycle." It is an operating feature of such systems that as the frequency of melt duty cycle changes, the flow rate characteristics of the heating system will correspondingly change. For higher frequency duty cycles, the melt rate goes up; for lower frequencies, the melt rate goes down.

Conventional systems used a fixed applied power supply to the heater that was predetermined to provide a desired melt rate, but since only one level of applied power was available, the actual melt rate could vary depending upon consequential ambient variant conditions or varying printing operations, i.e., a high demand of certain ink color versus a low demand of another ink color would result in different frequencies of the melt duty cycles for the different colors. Where the printing system is printing an unusually large amount of a particular color, the corresponding increase in frequency of the ink melt duty cycle similarly may have a consequence on the desired flow rate, that is, the supply ink may be heated to a higher temperature than normally expected before the start of a next duty cycle due to failure to have enough cool down times between the cycles. Additionally, it is not unusual for such printing systems to be employed in out of office environments such as in an unheated storage warehouse in a colder location to an uncooled airplane hangar in a desert location. Extreme ambient temperature conditions such as these examples can have an effect on the flow rate in a heating process where the heating element receives only a single level of applied power.

There is a need for an improved adaptive control system for the power supply for such ink melt heaters that can avoid the variances of ink melt rates resulting from consequential variant conditions. Improved precision in ink flow rate control provides consequent efficiencies in ink handling, i.e., less heat losses, smaller reservoir requirements and less heating of ink therein over shorter periods of time. The present exemplary embodiments satisfy this need as well as others to provide an adaptive power control system for ink melt heaters in phasing printing systems that can provide a substantially uniform ink melt rate. However, it is to be appreciated that the present exemplary embodiments are also amenable to other like applications where the supply of power to the heating element needs to be adjusted for enhanced control of items heated by the heater element.

BRIEF DESCRIPTION

A method and system is provided for selectively controlling supplied power to an ink melt heater for maintaining a desired ink melt rate despite a varying ambient parameter affecting an actual melt rate. A predetermined amount of power is initially supplied to the ink melt heater intended to cause the desired ink melt rate. An ambient parameter is detected to the ink melt heater that will likely have a consequential effect on a desired ink melt rate in view of the predetermined amount of power supplied to the ink melt heater. If the detected ambient parameter is determined to cause enough of a variance in the actual melt rate from the desired ink melt rate, the supplied power is adjusted from the predetermined amount to an adjusted amount for realizing the desired ink melt rate. The ambient parameter may comprise sensing a factor representative of either local environmental air temperature or ink temperature adjacent to the ink melt heater.

DETAILED DESCRIPTION OF THE PREFERRED EMBODIMENTS

Figure 1:
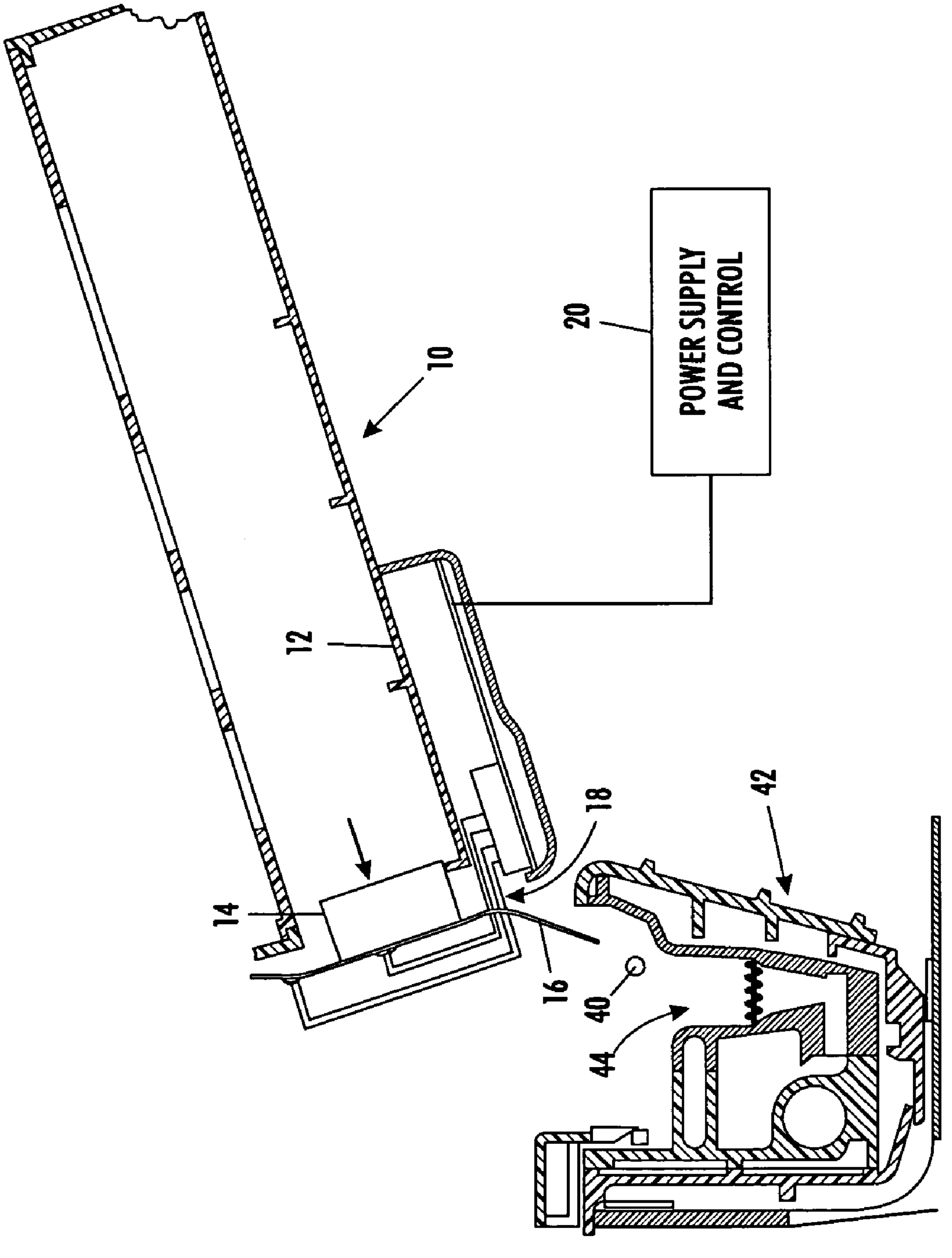
FIG. 1 is cross-sectional view in partial section of a print head, ink stick and ink loader assembly, and power supply and control system therefor.

With reference to FIG. 1, the basic elements of an ink supply system in an ink "phase-changing" printing system can be seen. Ink loader assembly 10 includes a tray 12 for holding a solid phase ink stick 14. An ink melt heater 16 is disposed at an open end 18 of the tray to contact the ink stick and to allow for egress of liquid phase ink during heating from the tray 10. The heating plate 16 receives its heating energy from a power supply and control system 20. The heating element includes an assembly with resistance traces thereon so that electrical energy supplied thereto can be converted to heat energy.

Figure 2:
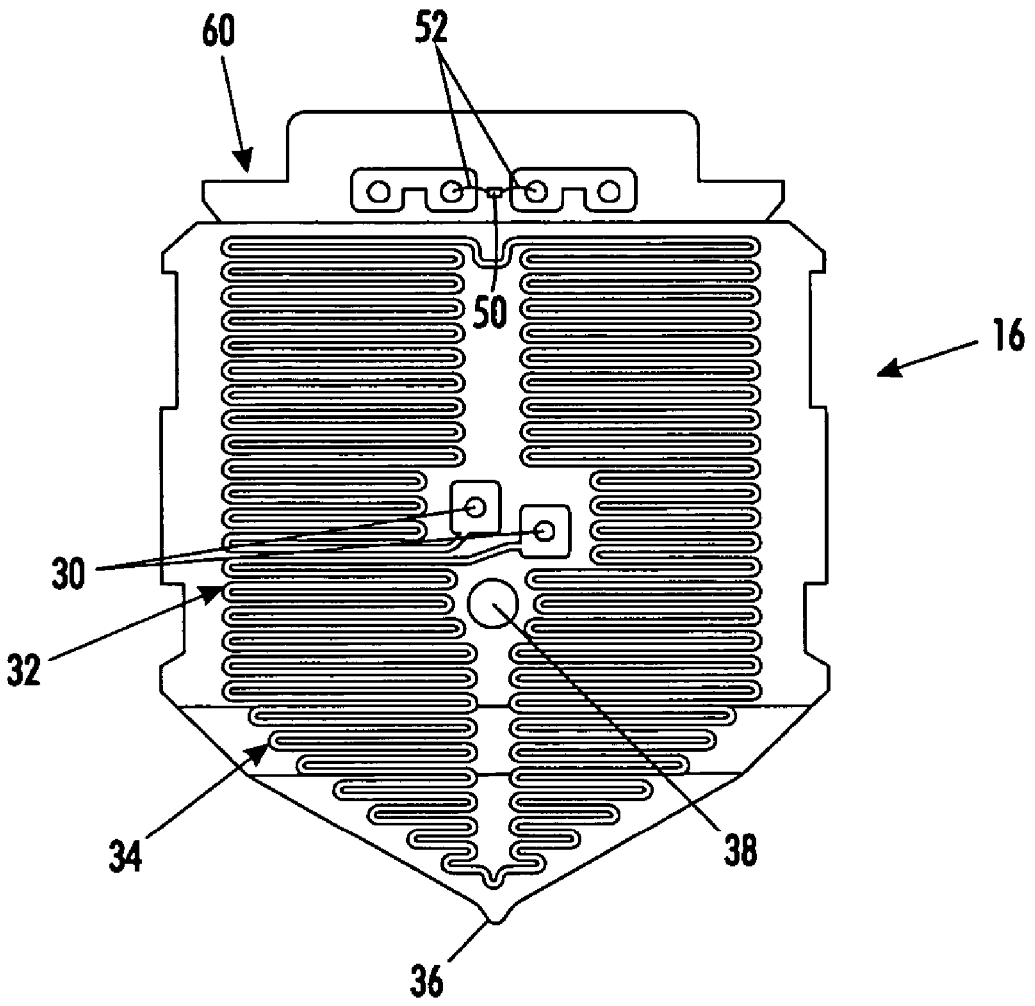
FIG. 2 is an end view of one embodiment of a heater melt plate.

With particular reference to FIG. 2, power pads 30 connect wires (not shown) from the power supply to the heat plate 16. The plate includes a first portion 32 disposed to engage the ink stick and phase change the solid ink stick to a liquid. A heated liquid ink zone 34 then allows the liquid ink to flow to an ink drip point 36. It should be appreciated that the embodiment shown in FIG. 2 comprises the side of the heater element having the heat traces shown. The ink stick will actually contact the element comprising a metallic heat plate on a back side from that shown in FIG. 2. A rivet hole 38 is used to attach the assembly of heat traces to the metallic plate.

FIG. 1 shows an ink drip 40 falling from the tray 10 and the heating element 16 assembly into a print head assembly 42. Print head assembly 42 comprises a reservoir 44 to receive the melted ink and to communicate the ink to nozzles (not shown) within the print head assembly for printing on a document. It should be appreciated with reference to FIG. 1 that the ink stick 14 is intended to engage the heat plate 16 as it is shown therein by being urged against the plate by gravity or a spring biased member (not shown) to enhance its contact between the stick 14 and the plate 16.

It is an advantageous feature of the present embodiments that a more uniform ink melt rate can be achieved for the filling of the reservoir 44 from the loader assembly 10 by adaptive power control of the ink melt heater 16. Such adaptive power control will make the ink melt rate largely independent of frequency variations in the ink melt duty cycle, starting ink temperatures of the solid ink stick 14 and local ambient temperature variations.

The present embodiment comprises an algorithm that monitors the ink temperature and/or local ambient temperature, next to the heater and computes a correction coefficient that adjusts the supply power to the heater prior to the melt cycle. FIG. 2 shows a thermistor device 50 associated with the plate 16 through thermistor pads 52. The thermistor device is operatively connected with the control system 20 to provide a signal representative of a plate temperature near the location of the thermistor. The thermistor is thus disposed on a fin portion 60 of the plate spaced from the ink melt zone 32. Although the thermistor device 50 is illustrated in the present embodiment for measuring a parameter representative of temperature, other well known temperature sensing devices could be employed, i.e., thermometers, electrical sensors, chemical sensors or the like. The temperature sensed by the thermistor can be a parameter indicative of ambient temperature to the system or the ink stick temperature prior to the start of a melt duty cycle.

The amount of applied heater power which is desired to be applied by the system 20 to the heating element 16 is a function of convection losses plus the energy to melt/mass ratio multiplied by a desired melt rate. By convection losses is meant the heater power losses to the local environment which is a function of local ambient temperatures (referred to in FIG. 3 as "Ta") Energy to melt/mass comprises the total energy to melt ink per unit mass and is a function of ink temperature (referred to in FIG. 3 as "Ts"). Applicants have found that a temperature at the plate of approximately 100° C. will generally produce the desired melt rate, i.e., an appropriate drip flow into the reservoir 44.

As noted above, the preferred embodiments comprise a smart algorithm that delivers precisely the amount of energy as needed for each melt cycle depending on the current ambient temperature and bulk supply ink temperature. To correct for the ink starting temperature, an ink temperature correction factor (ITCF) is applied, which is calculated as follows:

$$ITCF=1-Cp*Mf*(Ts-Ta)/(\text{Heater Power* \% Power Applied}) \quad (1)$$

Cp=average specific energy of solid ink between (30° C.–70° C.)

Mf=ink melt rate when Ts=Ta

Heater Power=Total heater wattage

% Power applied=% of heater wattage require to maintain Mf

To correct for the local ambient temperature effect, an environmental temperature correction factor (ETCF) is computed as follows:

$$ETCF=1-Ha*(100-Ta)/(\text{Heater Power* \% Power Applied})\ Ha=(\text{Heater Power* \% Power Applied}-\text{Mf*heat of melt/mass of ink from } Ta)/(100-Ta) \quad (2)$$

The corrected power to the heater thus comprises ITCF*ETCF*Heater Power* % Power Applied. Full cool down time from an ink duty cycle is approximately 45 minutes to an hour. In the present embodiment, the thermistor device is assumed to read the ambient temperature from the ink melt heater plate when the heater has not been powered in the last 45 minutes from a previous duty cycle.

Figure 3:
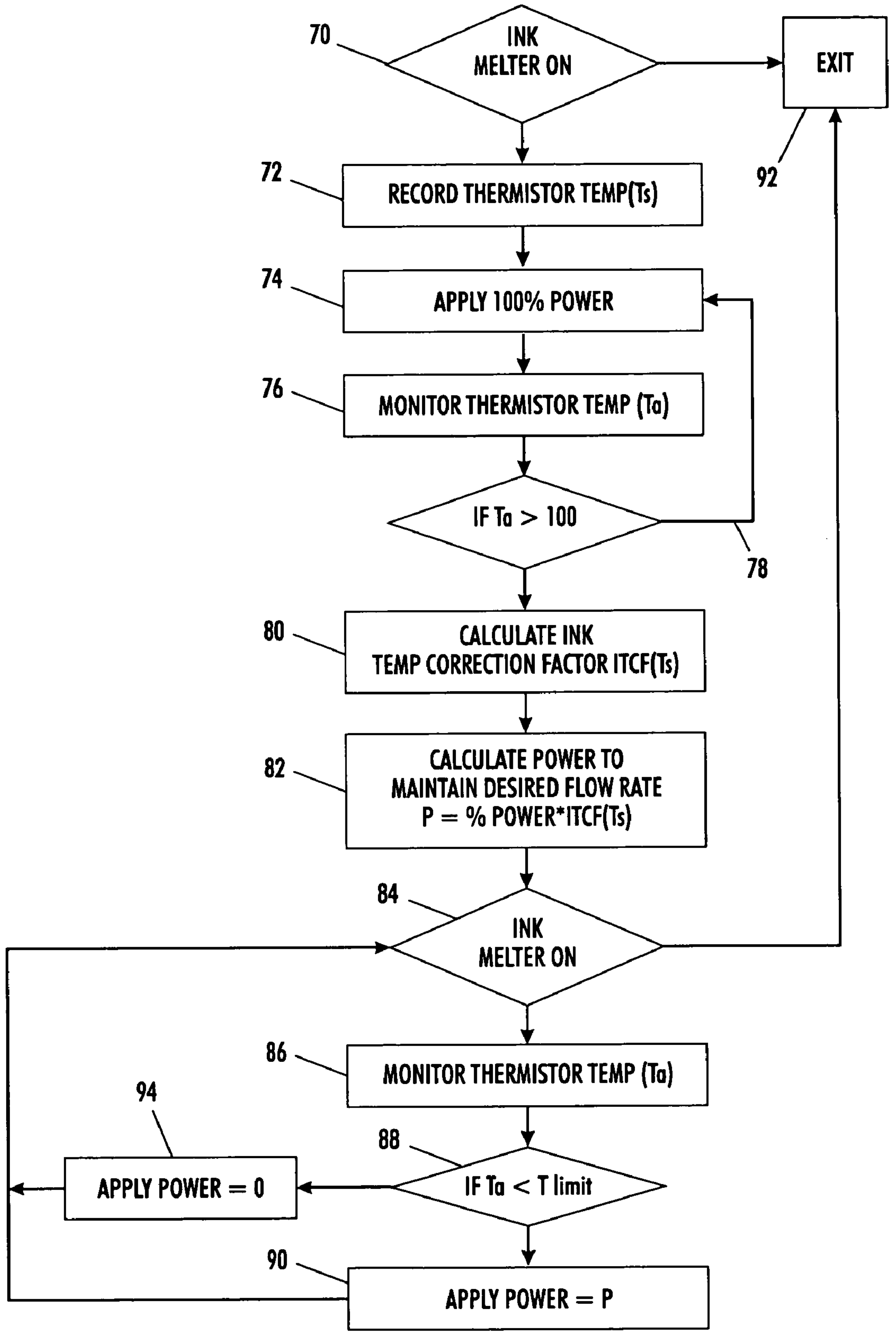
FIG. 3 is a flow chart of the control steps for adjusting applied power to the ink melt heater.

With particular reference to FIG. 3, a flow chart illustrating steps of the present embodiments is shown. Once the ink melt heater is turned on 70, the control system will monitor the temperature of plate 72, which is considered to be the starting temperature of the ink stick prior to the start of the melt cycle (Ts). At the same time, the predetermined amount of power to the ink melt heater is applied 74 and the temperature of the plate is monitored 76. If the monitored temperature is determined to be not greater than 100° C., then the full applied power signal is continued as indicated by return line 78. If the plate temperature monitored by the thermistor is greater than 100° C., then the ink temperature correction factor is calculated and the amount of power is further calculated 82 to maintain the desired flow rate. As long as the ink melter duty cycle continues in the step that the ink melter should be on 84, the temperature of the plate is monitored 86. So long as the temperature is less than a predetermined limit (for example, if the plate temperature were suddenly to spike up indicating a system failure) 88, then the power continues to be applied 90. The power will be applied until the system determines that the ink melter should be turned off 84, such as by the completion of the duty cycle or the refilling of the reservoir, and the system will exit 92. Block 94 indicates that when the temperature exceeds the predetermined limit, the power for the heater plate is turned off.

Figure 4:
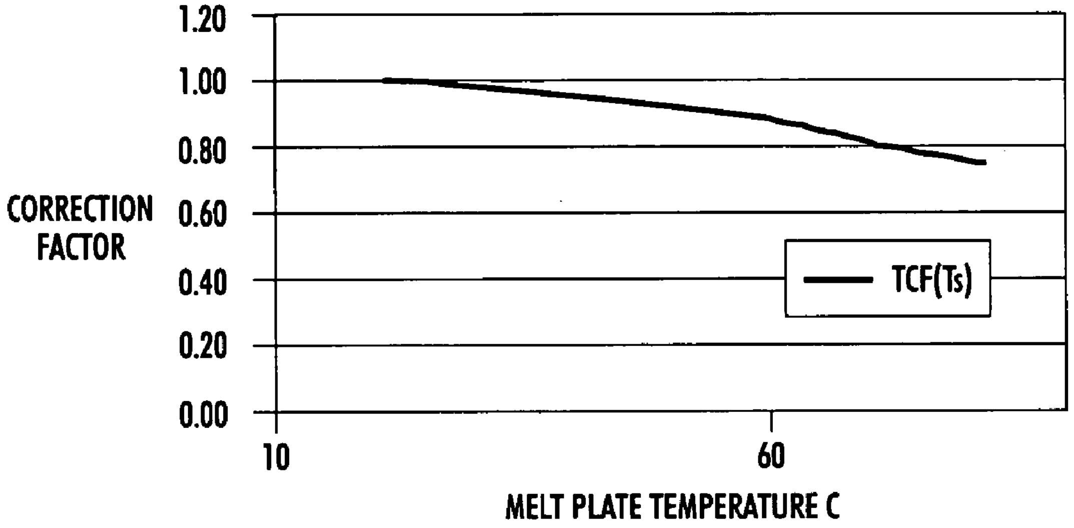
FIG. 4 is a graphical representation of a correction factor versus monitored temperature applied to the applied power in accordance with the subject control strategy.

With reference to FIG. 4, an exemplary embodiment of the applied correction factor is graphically seen as a function of the monitored melt plate temperature. It can be seen therein that as the melt plate temperature appreciably increases over what is considered to be normal ambient office temperatures, a reduction in applied power will result from the application of the correction factor.

It can be seen that the subject embodiments comprise detecting an ambient parameter to the heater plate device which will affect the actual melt rate of the ink stick when power is applied to the plate for the melting of the solid ink. It is only when the detected ambient parameter is perceived to cause a variance in the actual ink melt rate from the desired ink melt rate that the power to the heater plate needs to be adjusted. In the present embodiments the parameters that are monitored have been illustrated to comprise ambient temperature to the system or an increased temperature of the solid ink stick engaging the plate due to the lack of full cool down time to the system. A timer is disposed within the control circuit 20 for timing the elapsed time from a completion of a previous melt cycle. When the timer has not timed out a proper cool down elapsed time, it is assumed that the thermistor is detecting the starting temperature of the ink stick. The thermistor detects ambient temperature after the timer has timed out the cool down period.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for selectively controlling supplied power to an ink melt heater for maintaining a desired ink melt rate despite a varying ambient temperature affecting an actual melt rate, comprising:

supplying a predetermined amount of power to the ink melt heater intended to cause the desired ink melt rate;

detecting an ambient temperature to the ink melt heater with a thermistor;

determining if the detected ambient parameter will cause a variance in the actual ink melt rate from the desired ink melt rate; and, adjusting supplied power from the predetermined amount to an adjusted amount for realizing the desired ink melt rate including calculating temperature correction factors calculated to offset the variance and varying the supplied power by the temperature correction factor.

2. The method as defined in claim 1 wherein detecting the ambient temperature comprises sensing a factor representative of at least one of local environment air temperature or adjacent ink temperature.

3. The method as defined in claim 2 wherein the sensing of the factor representative of adjacent ink temperature is made prior to a start of a melt duty cycle.

4. The method as defined in claim 2 wherein the sensing of the ambient temperature occurs after the cool down cycle has been completed.

5. An assembly for heating a solid ink supply for changing a phase of the supply from solid to liquid at a desired melt rate including:

means for holding the solid ink supply to facilitate the heating and permit communication of the melted ink therefrom;

means for heating the solid ink supply;

a power supply for supplying energy to the heating means;

means for sensing an ambient temperature affecting melt rate of the supply comprising a thermistor associated with the means for holding; and, a control circuit for adjusting the supplied energy to the heating means in accordance with a temperature correction factor calculated in response to the ambient temperature wherein the adjusted supplied energy will maintain the desired melt rate.

6. The assembly as claimed in claim 5 wherein the ambient temperature comprises at least one of either local ambient temperature or a starting temperature of the solid phase ink stick prior to a melt cycle.

7. The assembly as claimed in claim 6 wherein the means for sensing comprises a thermistor associated with the heating means.

8. The assembly as claimed in claim 7 wherein the control circuit includes a timer for timing elapsed time from completion since the last melt cycle for the purpose of determining if enough time has lapsed to allow the heater to cool to ambient temperature, and the thermistor detects the starting temperature of the ink stick if the elapsed time from completion of the last melt cycle has not expired and detects the local ambient temperature after expiration of the elapsed time from completion of the last melt cycle.

9. The assembly as defined in claim 8 wherein the heating means includes a plate for engaging the ink stick and the plate includes a fin portion depending therefrom, and wherein the thermistor detects a temperature of the fin portion.

10. The assembly as claimed in claim 5 wherein the control circuit for adjusting the supplied energy to the heating means includes more than two distinct power settings and an additional off setting.

* * * * *